United States Patent
Sunnarborg (10) Patent No.: US 11,174,794 B2
(45) Date of Patent: Nov. 16, 2021

(54) VANE WITH SEAL AND RETAINER PLATE

(71) Applicant: United Technologies Corporation, Farmington, CT (US)

(72) Inventor: Amy M. Sunnarborg, Jupiter, FL (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 67 days.

(21) Appl. No.: 16/678,531

(22) Filed: Nov. 8, 2019

(65) Prior Publication Data

US 2021/0140371 A1    May 13, 2021

(51) Int. Cl.
*F02C 7/28* (2006.01)
*F01D 11/00* (2006.01)

(52) U.S. Cl.
CPC .............. *F02C 7/28* (2013.01); *F01D 11/005* (2013.01); *F05D 2220/32* (2013.01); *F05D 2230/60* (2013.01); *F05D 2240/12* (2013.01); *F05D 2240/55* (2013.01)

(58) Field of Classification Search
CPC ...... F02C 7/28; F01D 11/005; F05D 2220/32; F05D 2230/60; F05D 2240/12; F05D 2240/55
See application file for complete search history.

(56) References Cited

U.S. PATENT DOCUMENTS

| 5,630,700 A | 5/1997 | Olsen et al. | |
| 6,464,456 B2 | 10/2002 | Darolia et al. | |
| 7,033,135 B2* | 4/2006 | Mortzheim | F01D 9/065 415/115 |
| 7,452,189 B2* | 11/2008 | Shi | F01D 5/282 416/226 |
| 7,819,628 B2* | 10/2010 | Dervaux | F01D 5/189 416/96 A |
| 7,824,152 B2* | 11/2010 | Morrison | F01D 9/042 415/135 |
| 8,292,580 B2* | 10/2012 | Schiavo | F01D 5/189 416/96 A |
| 9,546,557 B2 | 1/2017 | Grooms, III et al. | |
| 9,726,028 B2* | 8/2017 | Marra | B22D 19/0072 |
| 9,951,639 B2* | 4/2018 | Ivakitch | F01D 11/005 |
| 9,970,317 B2* | 5/2018 | Freeman | F01D 9/042 |

(Continued)

FOREIGN PATENT DOCUMENTS

EP    3009601    4/2016

OTHER PUBLICATIONS

European Search Report for European Patent Application No. 20205669.3 completed Mar. 2, 2021.

*Primary Examiner* — Justin D Seabe
*Assistant Examiner* — Theodore C Ribadeneyra
(74) *Attorney, Agent, or Firm* — Carlson, Gaskey & Olds, P.C.

(57) ABSTRACT

A vane includes a vane piece that defines a first vane platform, a second vane platform, and a hollow airfoil section that joins the first vane platform and the second vane platform. The first vane platform defines a collar that projects therefrom. A spar piece defines a spar platform and a spar that extends from the spar platform into the hollow airfoil section. A retainer plate is bonded to the spar platform. The retainer plate and the spar platform define a groove, and there is a seal trapped in the groove. The seal seals against the collar of the first vane platform.

19 Claims, 5 Drawing Sheets

(56) References Cited

U.S. PATENT DOCUMENTS

| | | |
|---|---|---|
| 10,094,239 B2 | 10/2018 | Freeman et al. |
| 10,281,045 B2 * | 5/2019 | Sippel .................... F16J 15/44 |
| 10,344,606 B2 * | 7/2019 | Farah ..................... F01D 9/042 |
| 10,400,616 B2 * | 9/2019 | Tuertscher .............. F01D 5/189 |
| 10,801,343 B2 * | 10/2020 | Urac ....................... F01D 9/042 |
| 10,830,063 B2 * | 11/2020 | Freeman .................. F01D 5/20 |
| 2006/0228211 A1 | 10/2006 | Vance et al. |
| 2010/0054932 A1 | 3/2010 | Schiavo |
| 2010/0068034 A1 | 3/2010 | Schiavo et al. |
| 2017/0101880 A1 * | 4/2017 | Thomas ................ F01D 11/005 |
| 2020/0248569 A1 * | 8/2020 | Whittle ................ F01D 25/162 |

* cited by examiner

VANE WITH SEAL AND RETAINER PLATE

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Airfoils in the turbine section are typically formed of a superalloy and may include thermal barrier coatings to extend temperature resistance. Ceramic matrix composite ("CMC") materials are also being considered for airfoils. Among other attractive properties, CMCs have high temperature resistance and oxidation resistance. Despite these attributes, however, there are unique challenges to implementing CMCs in airfoils.

SUMMARY

A vane according to an example of the present disclosure includes a vane piece that defines a first vane platform, a second vane platform, and a hollow airfoil section that joins the first vane platform and the second vane platform. The first vane platform defines a collar. A spar piece defines a spar platform and a spar that extends from the spar platform into the hollow airfoil section. A retainer plate bonds to the spar platform. The retainer plate and the spar platform define a groove. A seal is trapped in the groove between the retainer plate and the spar platform and seals against the collar of the first vane platform.

In a further embodiment of any of the foregoing embodiments, the seal is a rope seal.

In a further embodiment of any of the foregoing embodiments, the rope seal is an endless loop.

In a further embodiment of any of the foregoing embodiments, the rope seal is ceramic.

In a further embodiment of any of the foregoing embodiments, the groove is tapered.

In a further embodiment of any of the foregoing embodiments, the retainer plate abuts the collar.

In a further embodiment of any of the foregoing embodiments, the spar platform includes a recess, and the retainer plate is disposed in the recess.

In a further embodiment of any of the foregoing embodiments, the spar piece defines an annular recess between the spar platform and the spar, and the collar extends in the annular recess.

In a further embodiment of any of the foregoing embodiments, the spar piece is metallic and the vane piece is ceramic.

In a further embodiment of any of the foregoing embodiments, the retainer plate is continuous and includes an opening having a shape that is complementary to the collar.

A gas turbine engine according to an example of the present disclosure includes a compressor section, a combustor in fluid communication with the compressor section, and a turbine section in fluid communication with the combustor. The turbine section has a vane that includes a ceramic vane piece that defines a first vane platform, a second vane platform, and a hollow airfoil section that joins the first vane platform and the second vane platform. The first vane platform defines a collar. A spar piece defines a spar platform and a spar that extends from the spar platform into the hollow airfoil section. A retainer plate bonds to the spar platform. The retainer plate and the spar platform define a groove. A seal is trapped in the groove between the retainer plate and the spar platform seals against the collar of the first vane platform.

In a further embodiment of any of the foregoing embodiments, the seal is a ceramic rope seal and is an endless loop.

In a further embodiment of any of the foregoing embodiments, the groove is tapered, and the retainer plate abuts the collar.

In a further embodiment of any of the foregoing embodiments, the spar platform includes a plate recess, the retainer plate is disposed in the plate recess, the spar piece defines an annular recess between the spar platform and the spar, and the collar extends in the annular recess.

A method for assembling a vane according to an example of the present disclosure includes providing the spar piece, bonding the retainer plate to the spar platform to thereby define a groove between the retainer plate and the spar platform and trap the seal in the groove, providing the vane piece, and bringing the vane piece and the spar piece together such that the seal seals against the collar.

A further embodiment of any of the foregoing embodiments includes, prior to the bonding, attaching the seal to the spar platform.

In a further embodiment of any of the foregoing embodiments, the attaching is by an adhesive.

A further embodiment of any of the foregoing embodiments includes, after the bonding, thermally removing the adhesive.

In a further embodiment of any of the foregoing embodiments, the bonding is metallurgical bonding.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
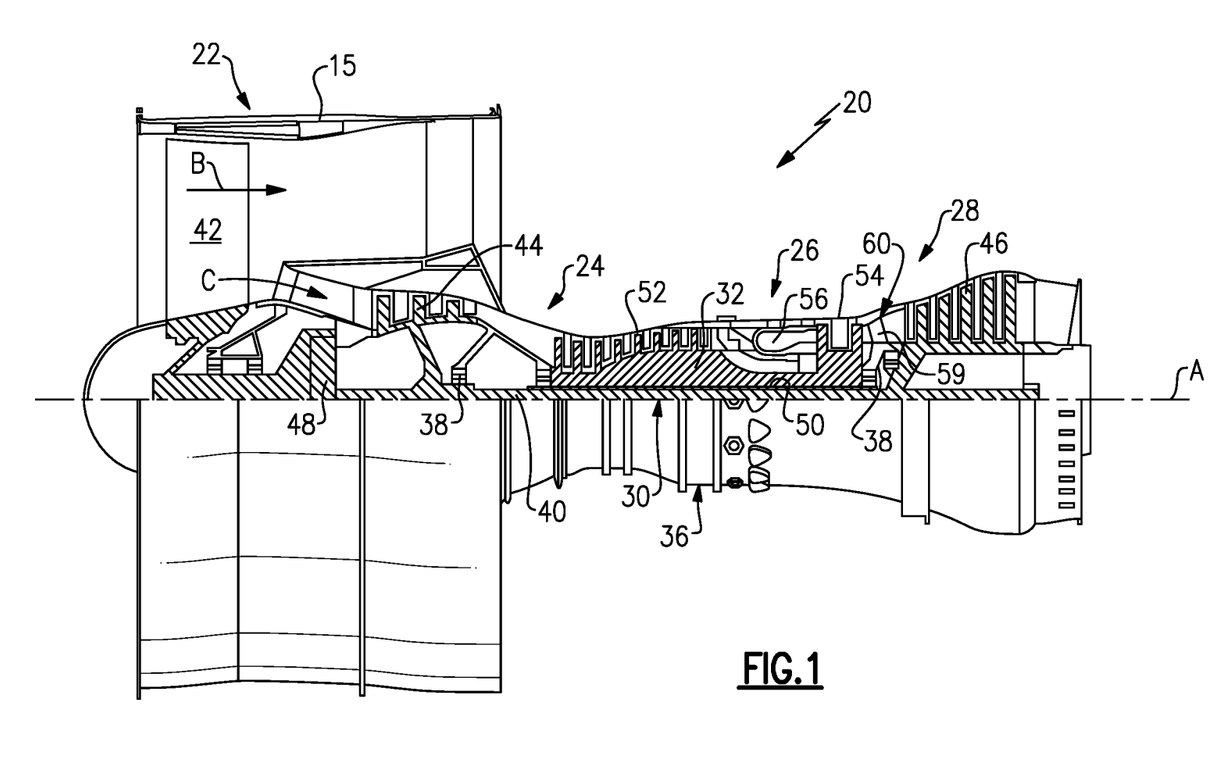
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. Terms such as "axial," "radial," "circumferential," and variations of these terms are made with reference to the engine central axis A. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Figure 2:
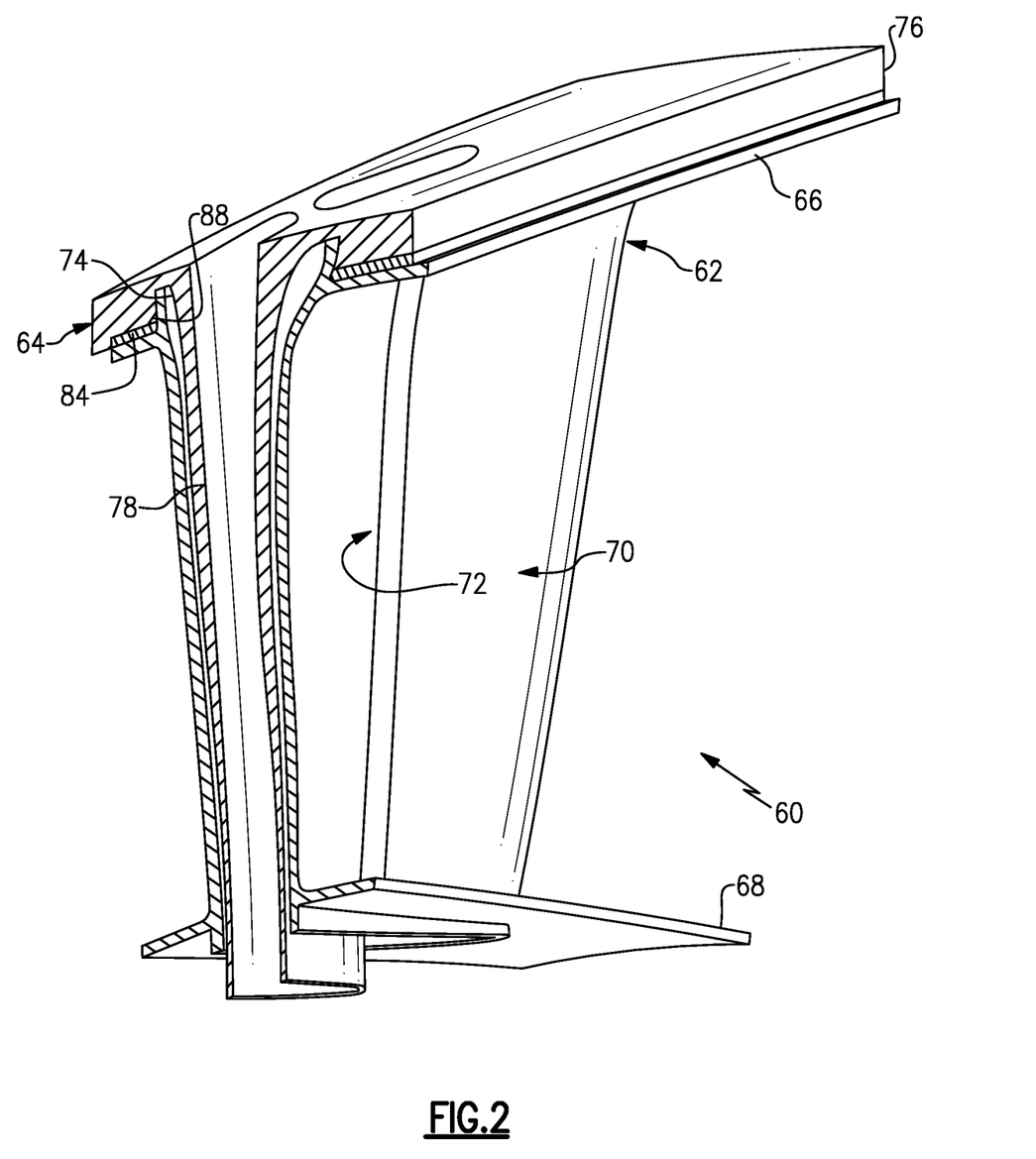
FIG. 2 illustrates a vane from the gas turbine engine.

FIG. 2 illustrates a sectioned view of a representative vane 60 from the turbine section 28 of the engine 20, although the examples herein may also be applied to vanes in the compressor section 24. A plurality of vanes 60 are situated in a circumferential row about the engine central axis A. The vane 60 is comprised of a vane piece 62 and a spar piece 64. The vane piece 62 includes several sections, including first (radially outer) and second (radially inner) platforms 66/68 and a hollow airfoil section 70 that joins the first and second platforms 66/68. The airfoil section 70 includes at least one internal passage 72. The airfoil section 70 extends beyond the first platform 66 to form a collar 74 that projects radially from the first platform 66. The terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa.

The vane piece 62 may be formed of a metallic material, such as a nickel- or cobalt-based superalloy, but more typically will be formed of a ceramic. The ceramic may be a monolithic ceramic or a ceramic matrix composite ("CMC"). Example ceramic materials may include, but are not limited to, silicon-containing ceramics. The silicon-containing ceramic may be, but is not limited to, silicon carbide (SiC) or silicon nitride ($Si_3N_4$). An example CMC may be a SiC/SiC CMC in which SiC fibers are disposed within a SiC matrix. The CMC may be comprised of fiber plies that are arranged in a stacked configuration and formed to the desired geometry of the vane piece 62. For instance, the fiber plies may be layers or tapes that are laid-up one on top of the other to form the stacked configuration. The fiber plies may be woven or unidirectional, for example. In one example, at least a portion of the fiber plies may be continuous through the first platform 66, the airfoil section 70, and the second platform 68. In this regard, the vane piece 62 may be continuous in that the fiber plies are uninterrupted through the first platform 66, the airfoil section 70, and the second platform 68. In alternate examples, the vane piece 62 may be discontinuous such that the first platform 66, the airfoil section 70, and/or the second platform 68 are individual sub-pieces that are attached to the other sections of the vane piece 62 in a joint.

Figure 3A:
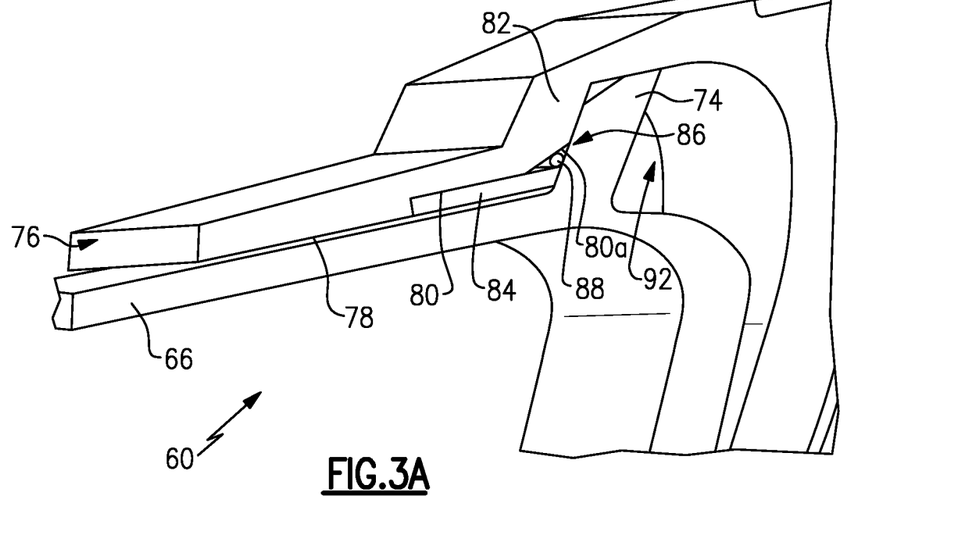
FIGS. 3A, 3B, and 3C illustrate sectioned view of the vane.
Figure 3B:
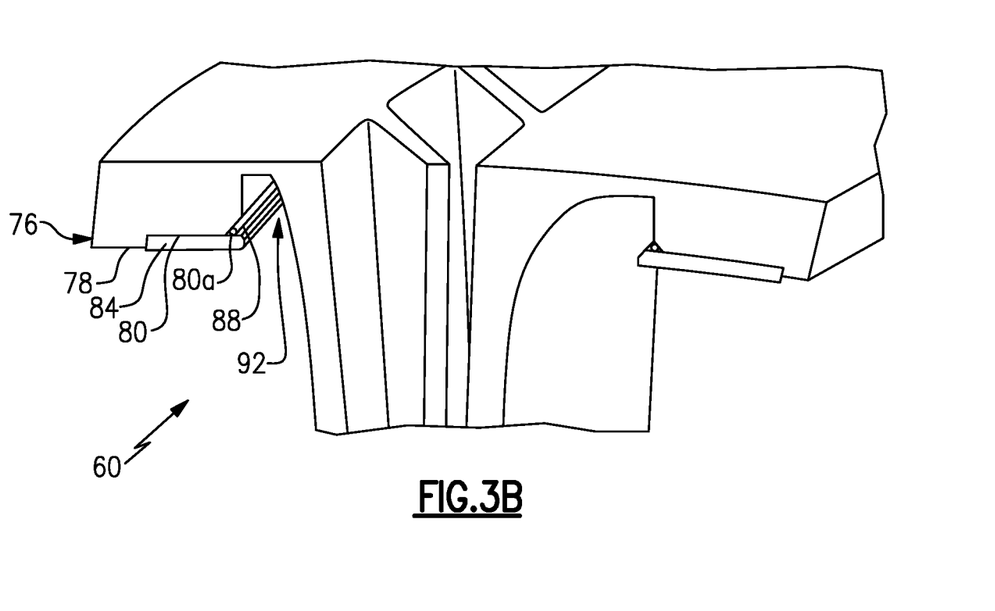
Figure 3C:
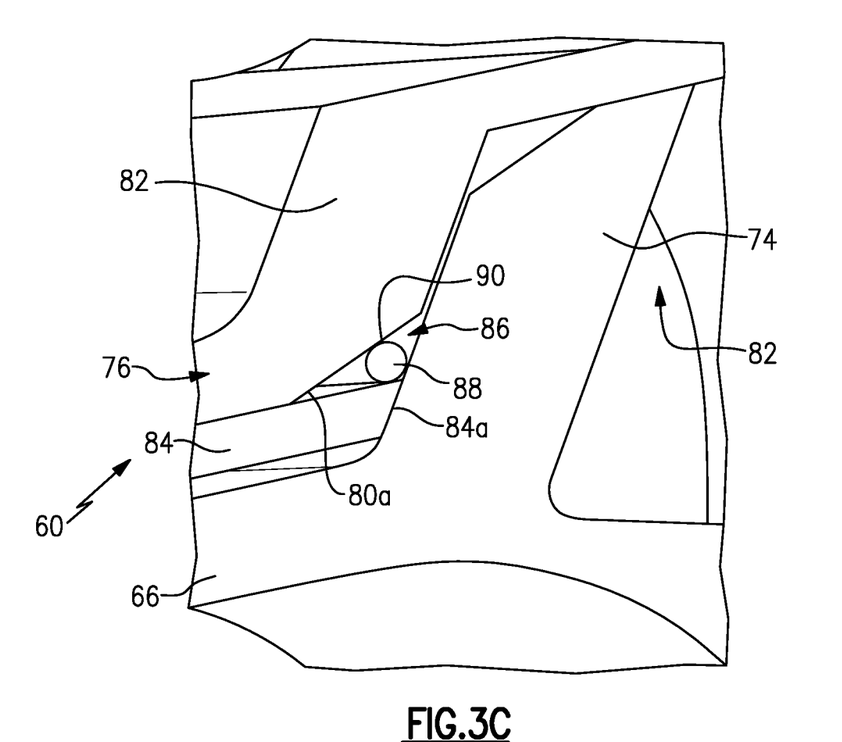

The spar piece 64 defines a spar platform 76 and a (hollow) spar 78 that extends from the spar platform 76 into the hollow airfoil section 70. For example, the spar piece 64 is formed of a metallic material, such as a nickel- or cobalt-based superalloy, and is a single, monolithic piece. Referring also to FIGS. 3A, 3B (excluding the vane piece 62), and 3C that show additional sectioned views of portions of the vane 60, the spar platform 76 includes a radial face 78 that defines a platform recess 80 that extends to a radial wall 82 of the spar platform 76. At the terminal end of the recess 80 at the radial wall 82 the recess 80 includes a sloped face 80a. The sloped face 80a is sloped relative to the remaining portion of the recess 80.

A retainer plate 84 is disposed in the recess 80 and is bonded to the spar platform 76. The retainer plate 84 generally sits flush in the recess 80 and may abut against the collar 74 of the ceramic vane piece 62 as shown in FIG. 3A. The retainer plate 84 cantilevers out over the sloped face 80a so as to define a groove 86 between the retainer plate 84 and the sloped face 80a of the spar platform 76. The use of the retainer plate 84 to form the groove 86 may facilitate avoiding having to form a groove in the vane piece 62, which may be mechanically undesirable and may also be more difficult to machine than metal due to hardness. The groove 86 in this example is tapered due to the sloped face 80a such that the mouth of the groove 86 is the widest point and the back of the groove 86 is the narrowest point. In particular, the space around the location of the groove 86 (i.e., the space from the groove 86 to the spar 78) is limited. In this regard, the retainer plate 84 facilitates forming the groove 86 without machining, which may be difficult and costly with the given space constraint.

A seal 88 is trapped in the groove 86 between the retainer plate 84 and the sloped face 80a of the spar platform 76. The seal 88 seals against the collar 74 of the first vane platform 66. During operation of the engine 20, cooling air, such as bleed air from the compressor section 24, may be provided through the spar piece 64 into the internal passage 72 of the airfoil section 70. The seal 88 serves to facilitate a reduction in air leakage from the internal passage 72 through the interface between the spar platform 76 and the first platform 66 of the vane piece 62.

In the illustrated example, the seal 88 is a rope seal. A rope seal is an elongated seal element, usually circular or oval in cross-section, which is formed of fibers. For example, the fibers may be in the form of yarns that are woven or braided to form the rope seal. In one example, the rope seal is ceramic, such as but not limited to, ceramic oxides. For instance, the ceramic oxide may include aluminum oxide mixed with silicon oxide and/or boron oxide. One example rope seal may be formed with NEXTEL fabric or fibers. Most typically, the seal 88 will be an endless loop (see FIG. 4) so that there are no seal joints. Alternatively, the seal 88 may be a two-ended segment that forms a loop in which the ends meet or overlap.

Figure 4:
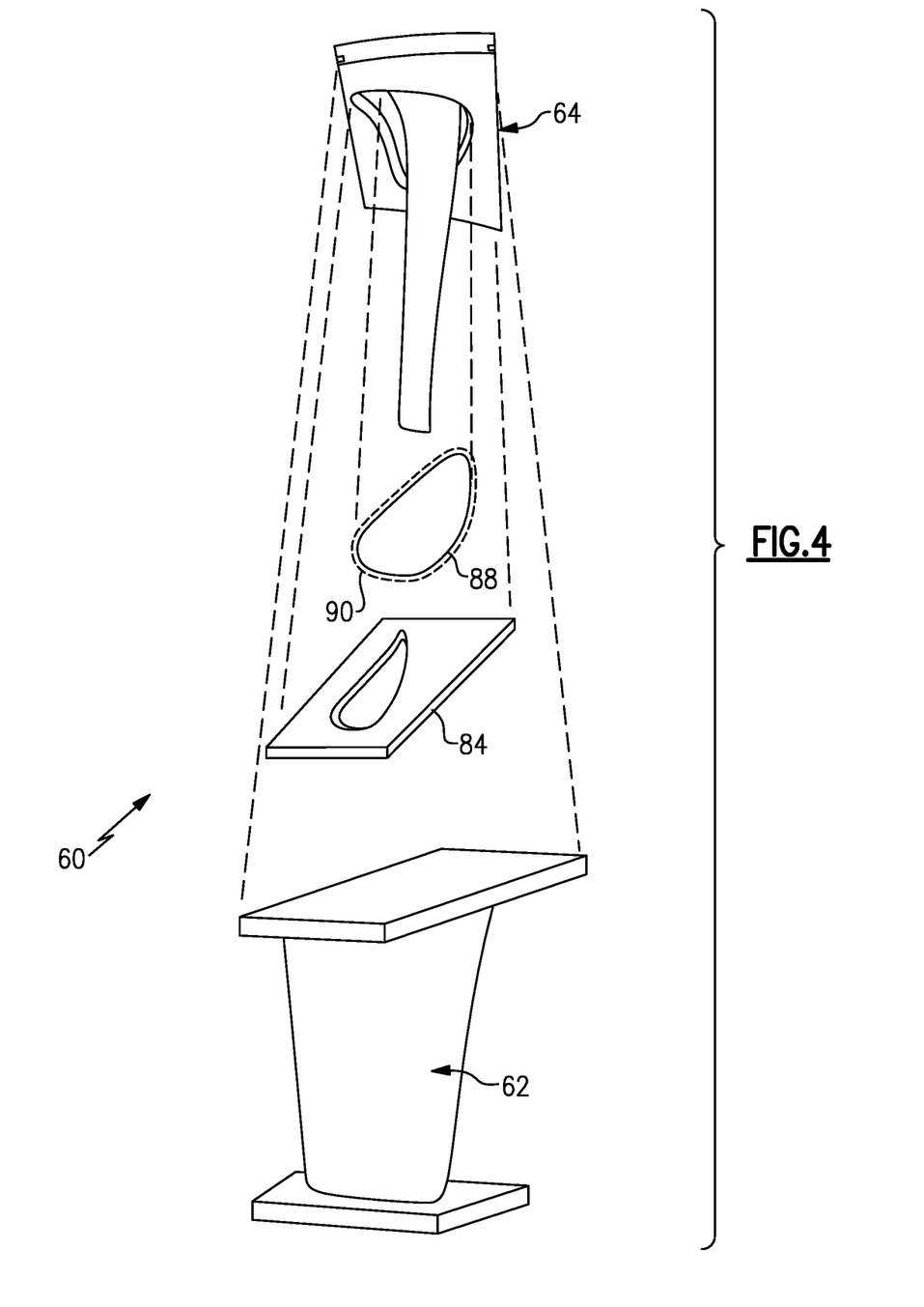
FIG. 4 depicts an expanded view of the vane to demonstrate a method of assembly.

FIG. 4 depicts an expanded view of the vane 60 in order to demonstrate a method of assembling the vane 60. The method includes bonding the retainer plate 84 to the spar platform 76 to thereby define the groove 86 between the retainer plate 84 and the spar platform 76 and trap a seal 88 in the groove 86. For example, prior to the bonding, the seal 88 is positioned on the spar platform 76 and then attached to the spar platform 76. In one example, the seal is attached by an adhesive 90 (see also FIG. 3C), such as a polymeric adhesive. If the seal 88 is a two-ended segment, the adhesive 90 may also be used to join the ends of the segment. The adhesive 90 may be applied to the seal 88, the spar platform 76, or both. In one further example, the adhesive 90 is later thermally removed. The thermal removal may occur during operation of the engine 20, from the elevated temperature environment around the vane 60, or from a dedicated thermal treatment prior to use in the engine 20.

Figure 5:
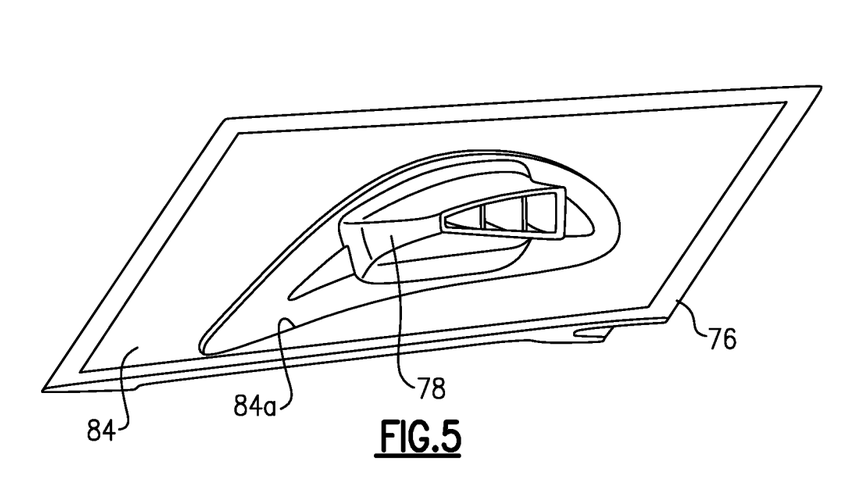
FIG. 5 illustrates a radial view of a retainer plate of the vane.

As part of the bonding process, the retainer plate 84 may be assembled onto the spar piece 64. For instance, as shown in the radial view in FIG. 5, the retainer plate 84 is a continuous sheet and includes an opening 84a that has a shape that is complementary to the collar 74 (see FIG. 3C). That is, the shape of the opening 84a tracks the periphery shape of the collar 74. The spar 78 of the spar piece 64 is inserted through the opening 84a and the retainer plate 84 is moved up the spar 78 and then into the recess 80 of the spar platform 76. Once positioned in the recess 80, the retainer plate 84, which may also be formed of a metallic material, such as the same composition of the metallic material as the spar piece 64, is subjected to a bonding process. The bonding process may include welding, such as tack welding, seam welding, or other technique for metal-joining. The retainer plate 84 is thereby metallurgically bonded to the spar platform 76.

Next, the vane piece 62 and the spar piece 64 are brought together such that the spar 78 extends into the internal passage 72 of the airfoil section 70. As the vane piece 62 moves up the spar 78, the collar 74 is received into an annular recess 92 (see FIGS. 3A, 3B, and 3C) defined between the spar platform 76 and the spar 78. In the fully seated position, the seal 88 seals against the collar 74. For example, the groove 86 facilitates retaining the seal 88 (along with the adhesive 90) in the proper position as the collar 74 moves past the seal 88 into the annular recess 92 during the assembly. Additionally, once in use during operation of the engine 20, the retainer plate 84 facilitates preventing the seal 88 from migrating down into the radius area between the collar 74 and the first platform 66 where the seal 88 may not properly seal.

The above methodology may be applied as an original fabrication of the vane 60, or as part of a repair or replacement process. For instance, the vane 60 may be disassembled so that the seal 88 can be replaced with a new seal 88, and the vane 60 then reassembled with the new seal 88 according to the methodology above. If needed, the retainer plate 84 may also be replaced.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vane comprising:
   a vane piece defining a first vane platform, a second vane platform, and a hollow airfoil section spanning in a radial direction and joining the first vane platform and the second vane platform, the first vane platform defining a collar projecting radially therefrom, an internal passage extending through the hollow airfoil section and the collar, the collar having a radial end face, an interior side, and an exterior side, relative to the internal passage;

a spar piece defining a spar platform and a spar extending from the spar platform into the hollow airfoil section;

a retainer plate bonded to the spar platform, the retainer plate and the spar platform defining a groove that opens toward the exterior side of the collar; and a seal trapped in the groove between the retainer plate and the spar platform, the seal sealing against the exterior side of the collar of the first vane platform.

2. The vane as recited in claim 1, wherein the seal is a rope seal.

3. The vane as recited in claim 2, wherein the rope seal is an endless loop.

4. The vane as recited in claim 2, wherein the rope seal is ceramic.

5. The vane as recited in claim 1, wherein the groove is tapered.

6. The vane as recited in claim 1, wherein the retainer plate abuts the collar.

7. The vane as recited in claim 1, wherein the spar platform includes a recess, and the retainer plate is disposed in the recess.

8. The vane as recited in claim 1, wherein the spar piece defines an annular recess between the spar platform and the spar, and the collar extends in the annular recess.

9. The vane as recited in claim 1, wherein the spar piece is metallic and the vane piece is ceramic.

10. The vane as recited in claim 1, wherein the retainer plate is continuous and includes an opening having a shape that is complementary to the collar.

11. The vane as recited in claim 1, wherein the vane piece is made of at least one fiber ply, and the at least one fiber ply is continuous through the first vane platform, the hollow airfoil section, and the second vane platform.

12. The vane as recited in claim 1, wherein the groove circumscribes the collar.

13. A gas turbine engine comprising:
a compressor section;
a combustor in fluid communication with the compressor section; and
a turbine section in fluid communication with the combustor, the turbine section having a vane including, a ceramic vane piece defining a first vane platform, a second vane platform, and a hollow airfoil section joining the first vane platform and the second vane platform, the first vane platform defining a collar projecting therefrom, a spar piece defining a spar platform, a spar extending from the spar platform into the hollow airfoil section, and an annular recess between the spar platform and the spar, the collar extending in the annular recess, a retainer plate bonded to the spar platform, the retainer plate and the spar platform defining a groove, and a seal trapped in the groove between the retainer plate and the spar platform, the seal sealing against the collar of the first vane platform.

14. The gas turbine section as recited in claim 13, wherein the seal is a ceramic rope seal and is an endless loop.

15. The gas turbine engine as recited in claim 14, wherein the groove is tapered, and the retainer plate abuts the collar.

16. The gas turbine engine as recited in claim 15, wherein the spar platform includes a plate recess, the retainer plate is disposed in the plate recess.

17. A method for assembling a vane, the method comprising:
providing a spar piece that defines a spar platform and a spar that extends from the spar platform;
attaching a seal to the spar platform by an adhesive;
bonding a retainer plate to the spar platform to thereby define a groove between the retainer plate and the spar platform and trap a seal in the groove; and
providing a vane piece that defines a first vane platform, a second vane platform, and a hollow airfoil section that joins the first vane platform and the second vane platform, the first vane platform defines a collar that projects therefrom;
bringing the vane piece and the spar piece together such that the seal seals against the collar.

18. The method as recited in claim 17, further comprising, after the bonding, thermally removing the adhesive.

19. The method as recited in claim 17, wherein the bonding is metallurgical bonding.

* * * * *